(12) United States Patent
Hughes

(10) Patent No.: US 6,493,772 B1
(45) Date of Patent: Dec. 10, 2002

(54) SYSTEM AND METHOD WITH GUARANTEED MAXIMUM COMMAND RESPONSE TIME

(75) Inventor: Joseph Paul Hughes, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/379,542

(22) Filed: Aug. 23, 1999

(51) Int. Cl.[7] .............................................. G06F 3/00
(52) U.S. Cl. .............................. 710/19; 710/15; 711/14
(58) Field of Search ........................... 710/19, 15, 267; 711/114; 714/39; 360/69, 75

(56) References Cited

U.S. PATENT DOCUMENTS

| | | | | |
|---|---|---|---|---|
| 5,613,088 A | * | 3/1997 | Achiwa et al. ............... 360/53 |
| 5,655,150 A | * | 8/1997 | Matsumoto et al. .......... 710/15 |
| 5,758,057 A | * | 5/1998 | Baba et al. ................ 711/114 |
| 5,890,204 A | * | 3/1999 | Ofer et al. ................ 711/100 |
| 5,996,030 A | * | 11/1999 | Ofer ........................... 360/69 |
| 6,292,851 B1 | * | 9/2001 | Takeda ........................ 360/69 |

* cited by examiner

*Primary Examiner*—Jeffrey Gaffin
*Assistant Examiner*—Harold Kim (57) ABSTRACT

The present invention is directed to a system in method implemented in a data storage system that provides a status corresponding to a command initiated by a host server to the host server within a guaranteed maximum command response time. In one aspect, the system and method of the present invention accomplish this by associating a time stamp with the command before it is distributed to a number of data storage devices to be executed. The progress of the command's execution is monitored at an interval less than the maximum command response time. If the present invention determines that the command will not complete within the maximum command response time, the system method of the present invention sends a corresponding status to the host server.

59 Claims, 7 Drawing Sheets

FIG. 1
(PRIOR ART)

Conventional I/O Process Data Structure 200

I/O Process Data Structure 400

SYSTEM AND METHOD WITH GUARANTEED MAXIMUM COMMAND RESPONSE TIME

FIELD OF THE INVENTION

The present invention relates generally to device controllers. More particularly, the invention relates to a system, apparatus, and method for a device controller in a data storage system to guarantee that a status corresponding to a command initiated by a host system is sent to the host system within a maximum command response time.

BACKGROUND

Figure 1:
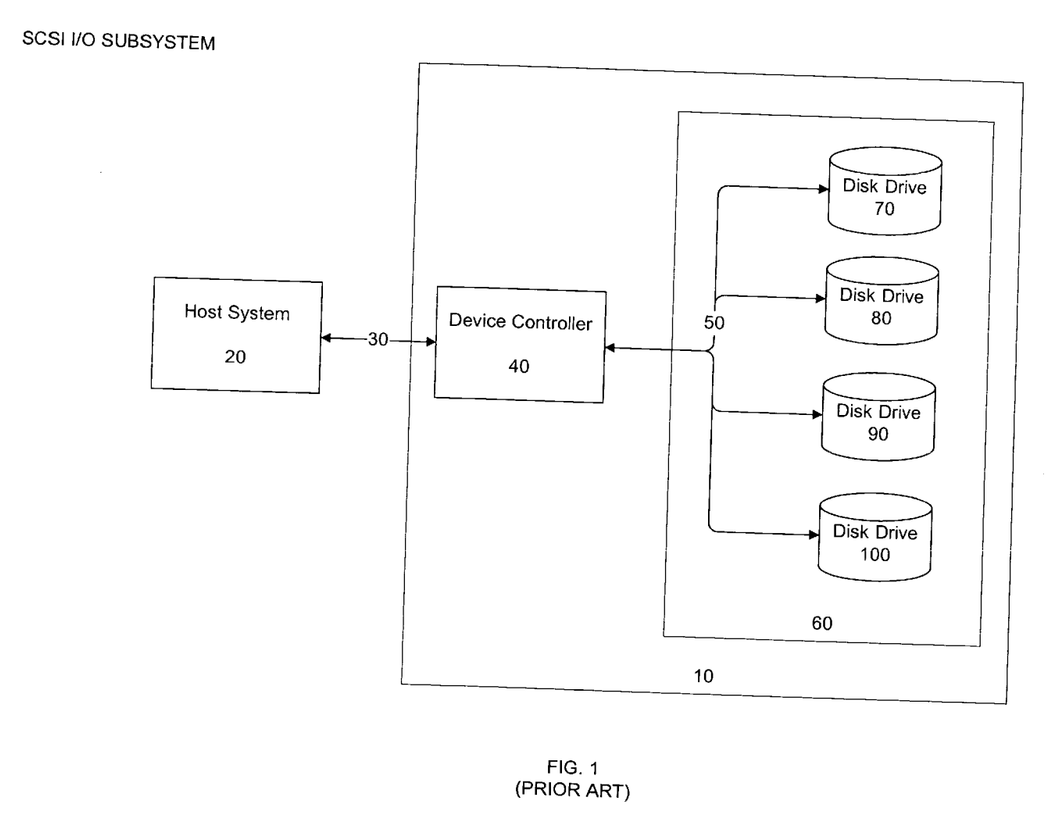
FIG. 1 illustrates a block diagram of a typical conventional SCSI I/O subsystem.

Referring to FIG. 1, there is shown Small Computer Systems Interface (SCSI) I/O subsystem 10 coupled to a host system 20 by host peripheral bus 30. SCSI (including SCSI-1, SCSI-2, and SCSI-3) is an ANSI standard device-independent input/output ("I/O") interface. In SCSI I/O subsystem 10, SCSI bus 50 connects device controller 40 to one or more disk storage devices in disk drive array 60, including, for example, disk drive 60, disk drive 70, disk drive 80, disk drive 90, and disk drive 100. The operation of SCSI buses is known. Disk drives may be arranged into one or more well known Redundant Array of Independent Disks (RAID) storage subsystems.

For purposes of this disclosure a "disk drive" is any non-volatile, randomly accessible, rewritable SCSI mass storage device which has the ability of detecting its own storage failures. It includes both rotating magnetic and optical disks and solid-state disks, for nonvolatile electronic storage elements, for example, PROMS, EPROMs, and EEPROMS. SCSI refers to the command and communication protocol, which may for example be implemented on wire (copper) or fibre channel physical links or loops.

Device controller 40 (hereinafter often referred to as "controller 40") is connected to host system 20, for example, a general-purpose computer, over host peripheral bus 30. Controller 40 controls I/O communications between host system 20 and disk drive array 60. Host System 20 may communicate with a plurality of controllers 40, and each controller may communicate with a plurality of disk drives or disk drive arrays 60. For example, controller 40 distributes SCSI commands initiated from host system 20 to at least a subset of the disk storage devices in disk drive array 60. The subset may be one, two, more than two, or all of the disk drives in disk drive array 60. Such SCSI commands include, for example, write data requests and read data requests. SCSI commands are well known in the art and a more detailed description of SCSI commands can be found in "The SCSI Bus & IDE Interface," Addison Wesley, second edition, Chap. 11, 1998, which is hereby incorporated by reference.

Host peripheral bus 30 can be any type of peripheral bus, including but not limited to a Peripheral Component Interconnect (PCI) bus, Industry Standard Architecture (ISA) bus, Extended Industry Standard Architecture (EISA) bus, Micro Channel Architecture, SCSI bus, Fibre Channel loop, Universal Serial Bus (USB), and the like.

According to SCSI standards, after a SCSI device, for example, disk drive 70, disk drive 80, disk drive 90, and/or disk drive 100, receives a SCSI command from a device controller, the SCSI device will execute the SCSI command and return SCSI command completion information to the device controller. Such completion information includes a corresponding SCSI status code that reports whether execution of the command was successful, whether an error occurred, or other information, such as for example busy status. In particular, standard SCSI status codes include the following statuses: good status, check condition status, condition met status, busy status, reservation conflict status, command terminated status, and the like. The meaning of these statuses can be found in Freidhelm and Schmidt, "The SCSI Bus & IDE Interface," Table 11.6, pg. 114, 1998, which is hereby incorporated by reference.

For each SCSI command that controller 40 receives from host system 20, controller 40 creates and executes a corresponding "input/output process" ("I/O process") in its memory (not shown). Conventional implementations of such I/O processes are known. However, for purposes of explanation, an I/O process performs a series of steps to either store or retrieve information from one or more physical SCSI devices, such as the disk drives described above, that are addressable by a device controller. The progress of an I/O process typically begins when it is created by a device controller in response to sending a SCSI command to one or more SCSI devices, and typically ends after SCSI command completion information has been returned to the host system. SCSI command completion information is typically returned to the system after controller 40 receives completion information from each SCSI device that is executing the SCSI command that the particular I/O process managing.

Figure 2:
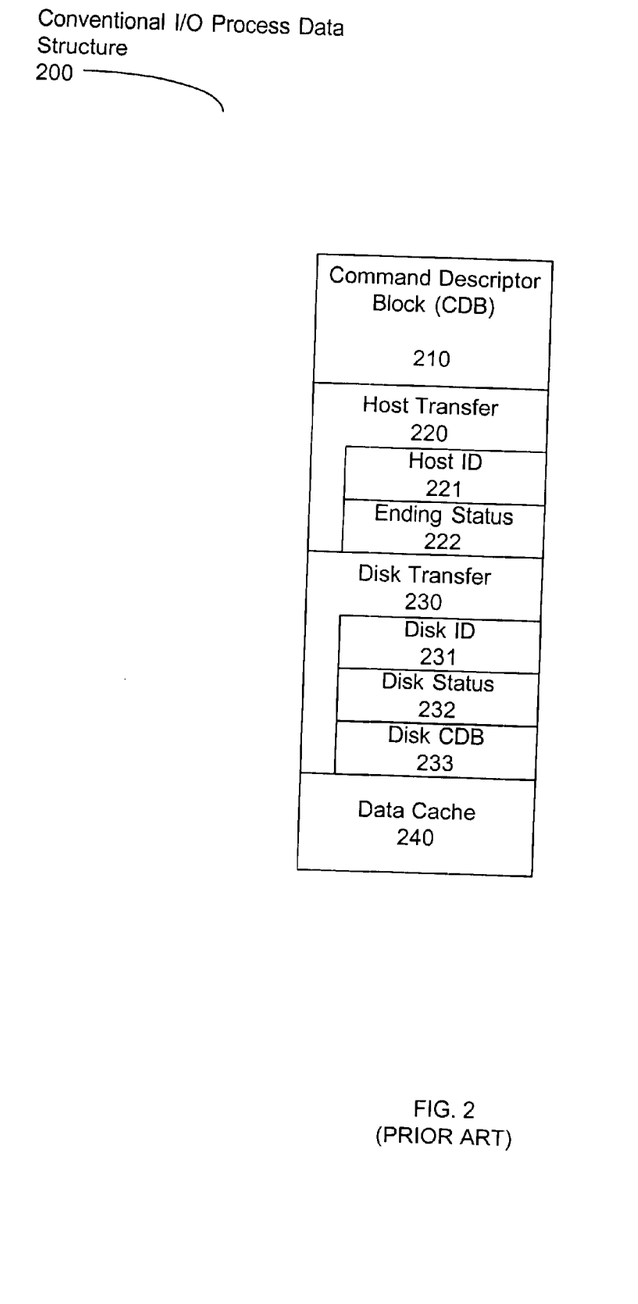
FIG. 2 illustrates a block diagram of a typical conventional I/O process data structure.

Referring to FIG. 2, there is shown an example of conventional I/O process data structure 200 defined in memory (not shown) in controller 40. For each I/O process that controller 40 creates, controller 40 also creates a corresponding conventional I/O process data structure 200. I/O process data structure 200 contains all required information necessary for controller 40 to track the progress of the corresponding I/O process. We will now discuss the conventional elements of I/O process data structure 200.

Command descriptor block ("CDB") 210 is a standard SCSI command descriptor block that contains a SCSI command proper and any parameters that are associated with the SCSI command. According to SCSI standards, host transfer block 220 contains information used by controller 40 to facilitate data transfers and/or status code transfers to and from a SCSI command initiating host system. Host ID 221 is typically a SCSI ID identifying the initiating host system. SCSI IDs are known. However, for purposes of explanation, a unique SCSI ID identifies each SCSI device on a SCSI bus, including the host server itself. SCSI IDs are generally set manually by changing a switch, or a jumper on each SCSI device. Some devices may be capable of automatically detecting and assigning an available SCSI device ID.

Ending status 222 is used by controller 40 to store a final status result of the execution of the SCSI command that is referenced in command descriptor block 210. Ending status 222 is sent by controller 40 to host server 20 upon completion of the SCSI command. Ending status 222 can assume similar values to those assumed by SCSI status codes, as discussed in great detail above.

Disk transfer block 230 is used by controller 40 to store information corresponding to data transfers, if any, with SCSI disk drives. Such information includes, for example disk ID 231, for identifying the SCSI ID of the SCSI disk drive that is transferring data.

Next, disk command descriptor block (CDB) 233 is used by controller 40 to store the SCSI command proper (including any SCSI command parameters). The contents of CDB 233 are not necessarily the same as the contents of CDB 210, but are related to the particular RAID algorithm that is being used to distribute data across the disk storage devices. Finally, disk status 232 is used by controller 40 to store a SCSI status code returned by the SCSI device that is executing the SCSI command proper. Because a device controller may use more than one SCSI device to execute a SCSI command, disk transfer block 230 is commonly implemented as a linked list data structure. Linked list data structures and the operation of linked list data structures are known, and for that reason are not described here in detail.

Data cache block 240 is used by controller 40 to store information to manage a local data cache to facilitate data transfers between a host system and one or more SCSI disk drives. Cache transfer operations are known and will not be described in greater detail here.

To assist in tracking the progress of a corresponding SCSI command, each I/O process typically uses a respective separate I/O process data structure 200. Such progress begins from the time that the SCSI command is distributed to one or more disk storage devices for execution, to the time that completion information is received from each disk storage device that was executing the SCSI command and that completion information is returned to the host system. After each disk storage device that was executing the SCSI command returns such completion information, controller 40 typically sends the completion information to the host system and subsequently deletes to the corresponding I/O process and returns an ending SCSI status to the SCSI command initiating host system. Ending SCSI statuses, as discussed above with respect to ending status 222 (see FIG. 2) can assume number of values, including, for example, "command complete", "service delivery or target failure", and "busy".

A significant problem with conventional data storage systems generally, and SCSI I/O subsystems more particularly, is that such subsystems can not guarantee that a status corresponding to a command initiated by a host system will be sent to the host system within a maximum command response time. This problem is especially significant with respect to a host server that is executing time critical applications and/or applications that require hardware fault tolerance, where such statuses can be used by the applications to facilitate the diagnosis of hardware errors and hardware failures.

For example, telephony applications implement voice message services that require hardware fault tolerance in the case of physical data storage device failures, such that access to voice message data is available to a consumer at all times. Such telephony applications could use the information contained in a status sent within a maximum command response time to reconfigure the data storage devices in a more timely manner, and thereby decrease any potential impact of the failed storage components.

Thus, there is a need for a system and method that guarantees that a status corresponding to a command initiated by a host system is sent to the host system within a maximum command response time and which overcomes the other limitations of conventional systems.

SUMMARY OF THE INVENTION

The present invention is directed to a system and method implemented in a data storage system. The data storage system is comprised of a device controller connected to a number of data storage devices, such as, for example, disk drives. The data storage system is operatively connected to a host system, for example, a general-purpose computer. The general-purpose computer initiates commands directed to the data storage system and in particular to the device controller which distributes each command for execution to a number of the data storage devices.

The method of the present invention includes a procedure that guarantees the host system, such as a server, that a status corresponding to a command initiated by the host server will be sent to it by the device controller within a maximum command response time. The procedure begins with the device controller associating a time stamp with a command from the host system. The time stamp represents the time that the command was received by the controller from the host system. Next, the procedure sets a first predetermined time interval to the value of the maximum command response time.

Next, the procedure sets a second predetermined time interval to a value less than the first predetermined time interval. The second predetermined time interval is used by a procedure executing in memory on the device controller to monitor the progress of the command as it executes. Finally, if the procedure determines that the command has not completed before expiration of the second predetermined time interval from the time stamp, the procedure will send a status to the host computer, and thereby provides the host computer with a guaranteed maximum command response time.

Apparatus, system, and computer program product implementing the inventive method and procedure are also provided.

BRIEF DESCRIPTION OF THE DRAWINGS

For a better understanding of the nature and objects of the invention, reference should be made to the following detailed description taken in conjunction with the accompanying drawings, in which.

DETAILED DESCRIPTION OF EMBODIMENTS OF THE INVENTION

To solve the afore described deficiency in traditional SCSI I/O subsystems generally, and SCSI I/O subsystems particularly, and facilitate the diagnosis of hardware errors and hardware failures in such subsystems, we now describe several embodiments of the invention relative to an inventive device controller 300.

Figure 3:
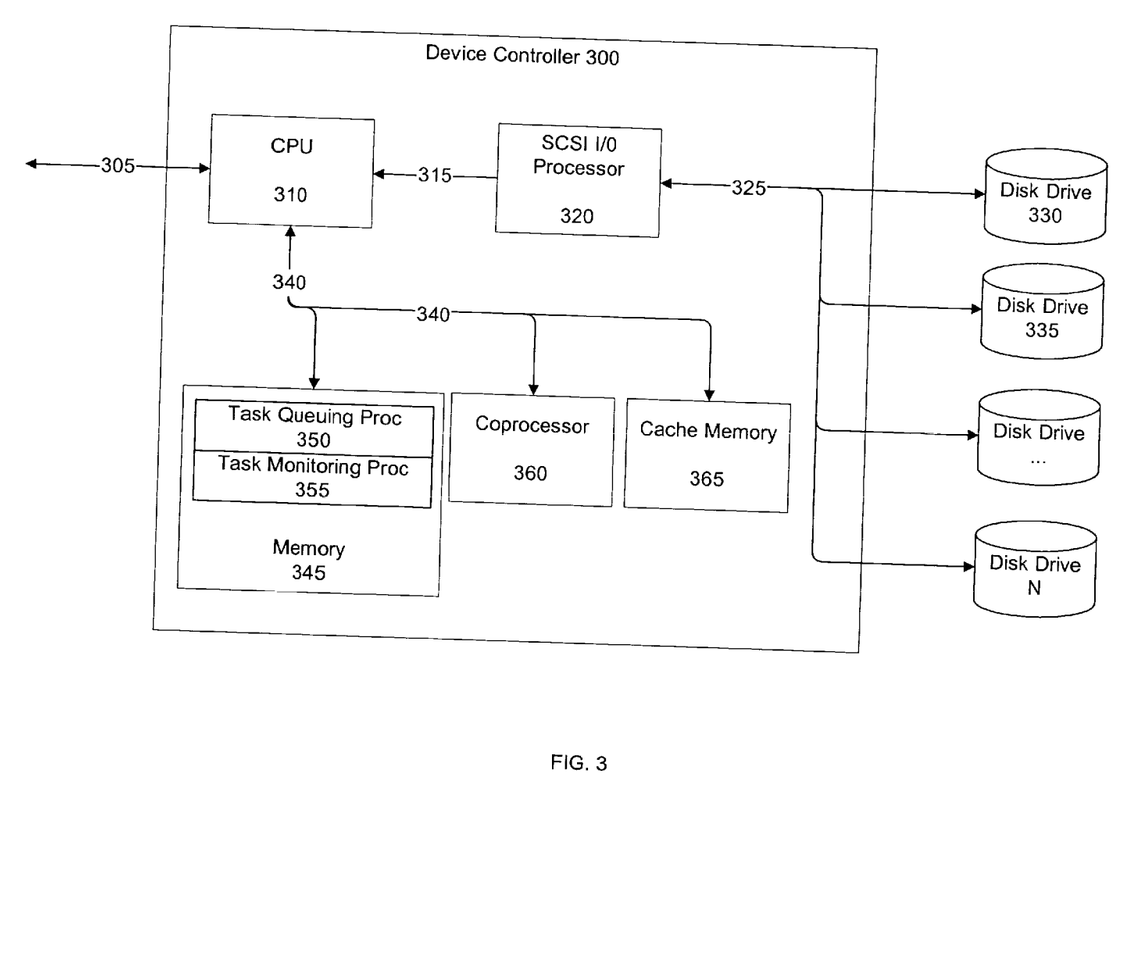
FIG. 3 illustrates a block diagram of one embodiment of an inventive device controller that guarantees that a status will be sent by the device controller to a command initiating host server within a maximum command response time.

With reference to FIG. 3, we will now describe an embodiment of inventive device controller 300, hereinafter often referred to simply as controller 300. A processor such as central processing unit, or "CPU" 310 is connected to host peripheral bus 305 and hence to a host computer (not shown). CPU 310 is also coupled to secondary peripheral bus 315 as are one or more SCSI I/O processors, for example, SCSI I/O processor 320. SCSI I/O processor 320 is coupled to SCSI bus 325, acting as an interface between secondary peripheral bus 315 and SCSI bus 325 which accesses peripheral devices, for example, disk drive 330, disk drive 335, disk drive . . . , and disk drive N, or other storage devices. The disk drive devices may be formed into one or more RAID disk arrays. While the preferred embodiment of the invention is described relative to SCSI commands, the invention is not limited to SCSI commands, SCSI control types, or SCSI devices.

CPU 310 is also coupled to local bus 340 internal to controller 300, which in turn is coupled to memory 345, and optional coprocessor 365. Coprocessor 365 is optional but is desirably provided to perform error correction code encoding and decoding on data that is read to and from the peripheral devices. Error correction code encoding and decoding use well-known methods of verifying and maintaining data integrity, especially in magnetic disk drive devices, and are therefore not described in further detail here. Coprocessor 360 is operatively coupled to on-board cache memory 365 which is used by coprocessor 360 to temporarily store data most recently read and written by a host system. The use of cache memory is known and not described in further detail here.

In a preferred embodiment: (a) controller 300 is a DAC960 series RAID controller made by Mylex™ of Fremont, Calif. which may be used with the inventive system and method (including inventive procedures executed from firmware stored in memory 345 of controller 300) to provide a guaranteed maximum command response time to SCSI commands described herein; (b) CPU 310 is a 32-bit Intel i960 RISC microprocessor with multitasking functionality; (c) memory 345 is a flash erasable/programmable read only memory (EPROM); (d) on-board cache memory 365 has 16 MB or more of data cache; (e) host peripheral bus 305 is a primary PCI bus; and (f) second peripheral bus 325 is a secondary PCI bus. Those workers having ordinary skill in the art in light of the description provided here will appreciate that components other than those identified with the preferred embodiment may alternatively be used.

Memory 345 is used by CPU 310 and coprocessor 360 as volatile storage to store procedures and data, for example: (a) task queuing procedure 350, for determining whether a SCSI command is of the type that a host system expects an ending SCSI status from controller 300 within a guaranteed maximum command response time, and if so, adding a reference to an I/O process that is tracking the progress of the SCSI command a monitor queue; (b) task monitoring procedure 355, for determining which of those I/O processes, if any, that are being monitored for maximum command response require a SCSI status to be sent to a respective initiating host system within the maximum command response time, and, upon finding such an I/O process, sending a status to that I/O processes' command initiating host system; and (c) one or more I/O process data structures 400, for tracking the progress of one or more SCSI commands and supporting the guaranteed maximum command response time of the present invention.

Through the procedures of task queuing procedure 350 and task monitoring procedure 355, controller 300 solves the problem exhibited by conventional SCSI I/O subsystems, for example, problems exhibited by SCSI I/O subsystem 10, by guaranteeing that a status corresponding to a command initiated by a host system is sent to the host system within a maximum command response time.

I/O Process Data Structure 400

Figure 4:
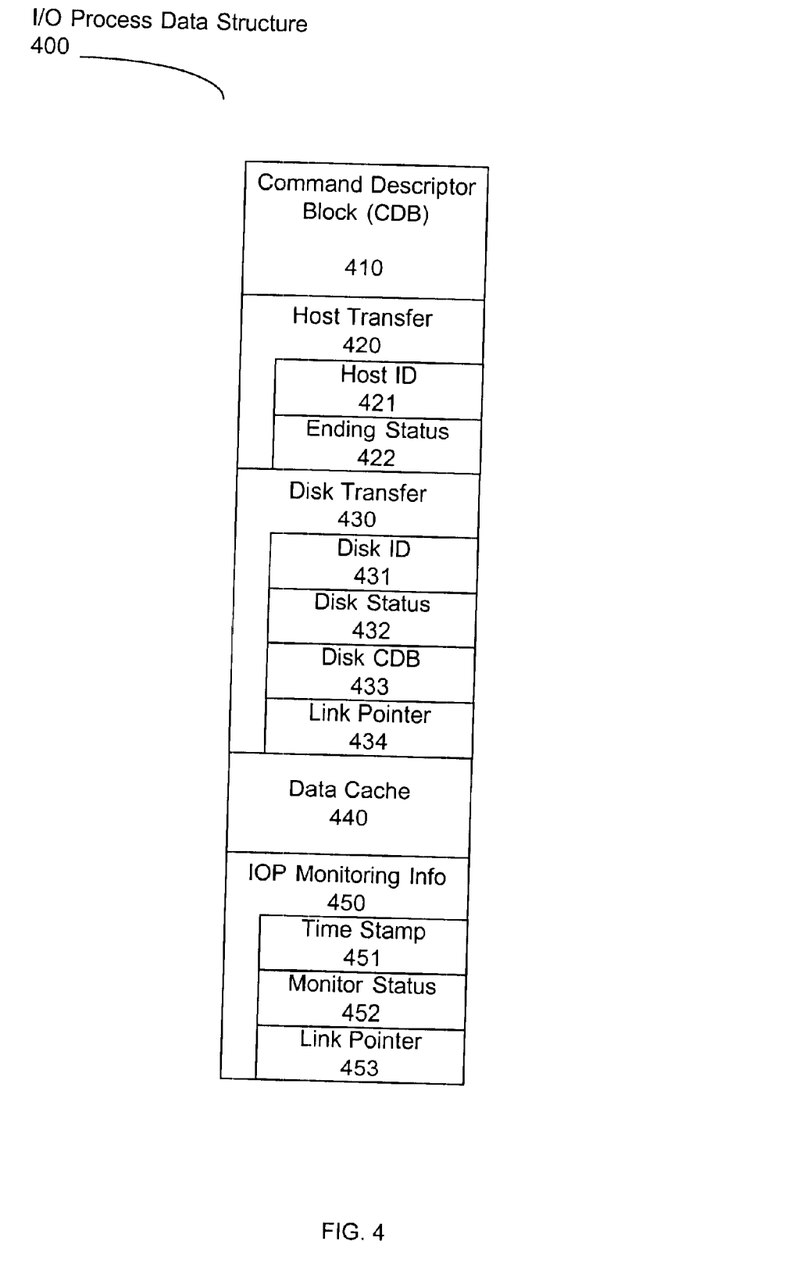
FIG. 4 illustrates a block diagram of one embodiment of an I/O process data structure of the present invention.

Referring to FIG. 4, there is shown I/O process data structure 400. Task queuing process 350 and task monitoring process 355 (FIG. 3) use I/O process data structure 400 to store information enabling controller 300 to track the progress of SCSI commands and support the guaranteed maximum command response time of the present invention.

Command descriptor block ("CDB") 410 is a standard SCSI command descriptor block that contains a SCSI command proper and any parameters that are associated with the SCSI command. Host transfer block 420 contains host ID 421 which is typically a SCSI ID identifying the initiating host system. SCSI IDs are known. However, for purposes of explanation, a unique SCSI ID identifies each SCSI device on a SCSI bus, including the host system itself. SCSI IDs are generally set manually by changing a switch, or a jumper on each SCSI device.

Ending status 422 supplies information to controller 300 on whether the SCSI command stored in CDB 410 was executed successfully. Ending status 422 is sent by controller 300 to a host server upon completion of the SCSI command. Ending status 222 can assume similar values to those assumed by SCSI status codes, as discussed in greater detail above.

Disk transfer block 430 is used by controller 300 to store disk ID 231, for identifying the SCSI ID of a physical SCSI device that is executing the particular I/O request, and disk status 432 to store the status byte returned to the controller by the physical SCSI device at the status phase of the respective SCSI command (See CDB 410 in FIG. 4).

Next, I/O Process Data Structure 400 includes disk CDB 433, used by controller 300 store the SCSI command proper (including any SCSI command parameters). The contents of CDB 433 are not necessarily the same as the contents of CDB 410, but are related to the particular RAID algorithm that is being used to distribute data across the disk storage devices. Knowledge of the particular contents of CDB 433 is not necessary to practice the present invention, and for that reason are not discussed in greater detail herein.

Device controller 300 may use more than one SCSI device to execute a SCSI command. Thus, in a preferred embodiment of the present invention, link pointer 434 is used by controller 300 to implement disk transfer block 430 as a linked list data structure, wherein each SCSI device that is executing the command will have a corresponding disk transfer block 430. Linked list data structures and the operation of linked list data structures are known. For a detailed description of the operation of linked list data structures, refer to "C The Complete Reference," Herbert Schildt, pages 504–513, 1987, which is hereby incorporated by reference for background purposes.

Data cache block 440 is used by controller 300 to store information facilitating data transfers between a host system and one or more SCSI disk drives. Cache transfer operations are known and will not be described in greater detail here.

IOP monitoring info block 450 is used by controller 300 to store information with respect to a monitored SCSI command. Time stamp 451 is used by controller 300 to store a value that indicates when the I/O process that is tracking the SCSI command identified in command descriptor block 433 was created, which correlates with the time that the SCSI command was received by controller 300 from the system.

Monitor status 452 is used by controller 300 to indicate whether an ending status has already been sent to the SCSI command initiating host system with regard to the particular SCSI command identified by disk CDB 433. In a preferred embodiment of the present invention, monitor status 452 is initialized to FALSE, when controller 300 receives the SCSI command from the host system. Monitor status 452 is set to equal TRUE when task monitoring process 355 sends an ending status of busy is sent to the host system as a result of the command not completing within a time period less the maximum command response time.

Monitor status 452 is used to prevent a race condition in the event that the timed out SCSI command completes on its own. As discussed in greater detail below with respect to Improved Execution Speed for Re-Tried Commands through Improved Cache Memory Management, an I/O process that is monitoring a SCSI command that is timed out is not removed by the present invention, but allowed to complete. When a SCSI command completes, the present invention checks monitor status 452 to determine whether an ending status was already sent to the system, and if it was, another ending status will not be sent. In this manner, the host system will not receive more than one ending status for any one SCSI command that it submits to controller 300 for execution. In a preferred embodiment, time stamp 451 is stored as a 32-bit unsigned integer in controller 300 memory 345, and monitor status 452 is an 8-bit variable.

Link pointer 453 is used by controller 300 to point to other I/O process data structures 400 that are being monitored by task monitor process 355 (discussed in greater detail below with regard to FIG. 6) for guaranteeing that an ending SCSI status will be returned to a host server within a predetermined maximum command response time. Hereinafter, the linked list of I/O process data structures 400 that are linked by linked pointer 453 are often referred to as the I/O process monitor queue 500.

Figure 5:
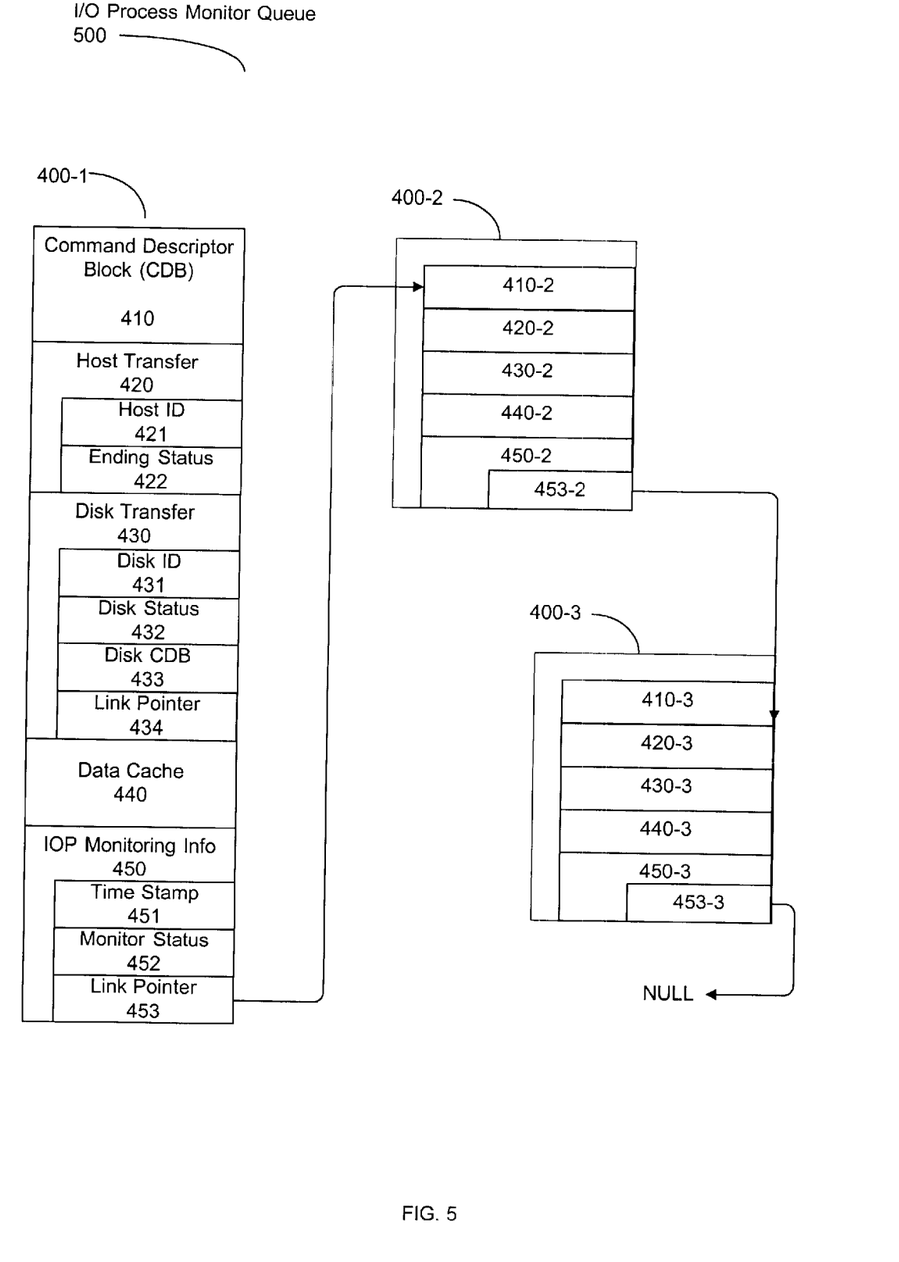
FIG. 5 illustrates a block diagram of an embodiment of an I/O process monitor queue according to the invention.

Referring to FIG. 5, there is shown an example of I/O process monitor queue 500. Although IOP Monitor Queue 500 can be implemented in a variety of ways, including, for example, as a static sized array, it is desirable that in a preferred embodiment of the invention, that IOP Monitor Queue 500 be implemented as a linked list for two primary reasons.

The first reason is to permit creation of an array of I/O process data structures 400 of arbitrary and unknown size in memory 345 at the time of creation. If the amount of storage needed to store the array of I/O process data structures 400 was known in advance, then a static size array could be used. However, because it is not known how many SCSI commands will be monitored for returning and ending SCSI status to a host server within a maximum command response time when the data structure is created or initialized, the actual size of the array is not known. A linked list has arbitrary size and can be extended at will as such new commands to be monitored are identified, so, a linked list is most efficient.

The second reason is that using a linked list allows I/O process data structures 400 to be inserted and removed easily (as described below) without having to rearrange the elements in IOP Monitor Queue 500, as would be needed in a static sized array.

A singly linked list requires that each item of information in the linked list contain a link pointer to the next element in the list. In this embodiment of the invention, each item in the linked list is an I/O process data structure 400, for example, I/O process data structure 400-1, I/O process data structure 400-2, and I/O process data structure 400-3. An arbitrary number (e.g. M) of I/O processes and I/O process data structures may be provided. IOP data structure 400-1 has link pointer 453-1 to the next I/O process data structure 400-2, which in turn has link pointer 453-2 to the next I/O process data structure 400-3. Because I/O process data structure 400-3 is the last data structure in the list, link pointer 453-3 is null.

Linked lists are known in the art. Thus, the detailed processes of inserting an element, for example, I/O process data structure 400, into a link list, and removing an element, for example, I/O process data structure 400, from a link list are not described in detail here. For a detailed description of the operation of linked lists, refer to "C The Complete Reference," Herbert Schildt, pages 504–513, 1987, which is hereby incorporated by reference.

Task Queueing Procedure 350

Figure 6:
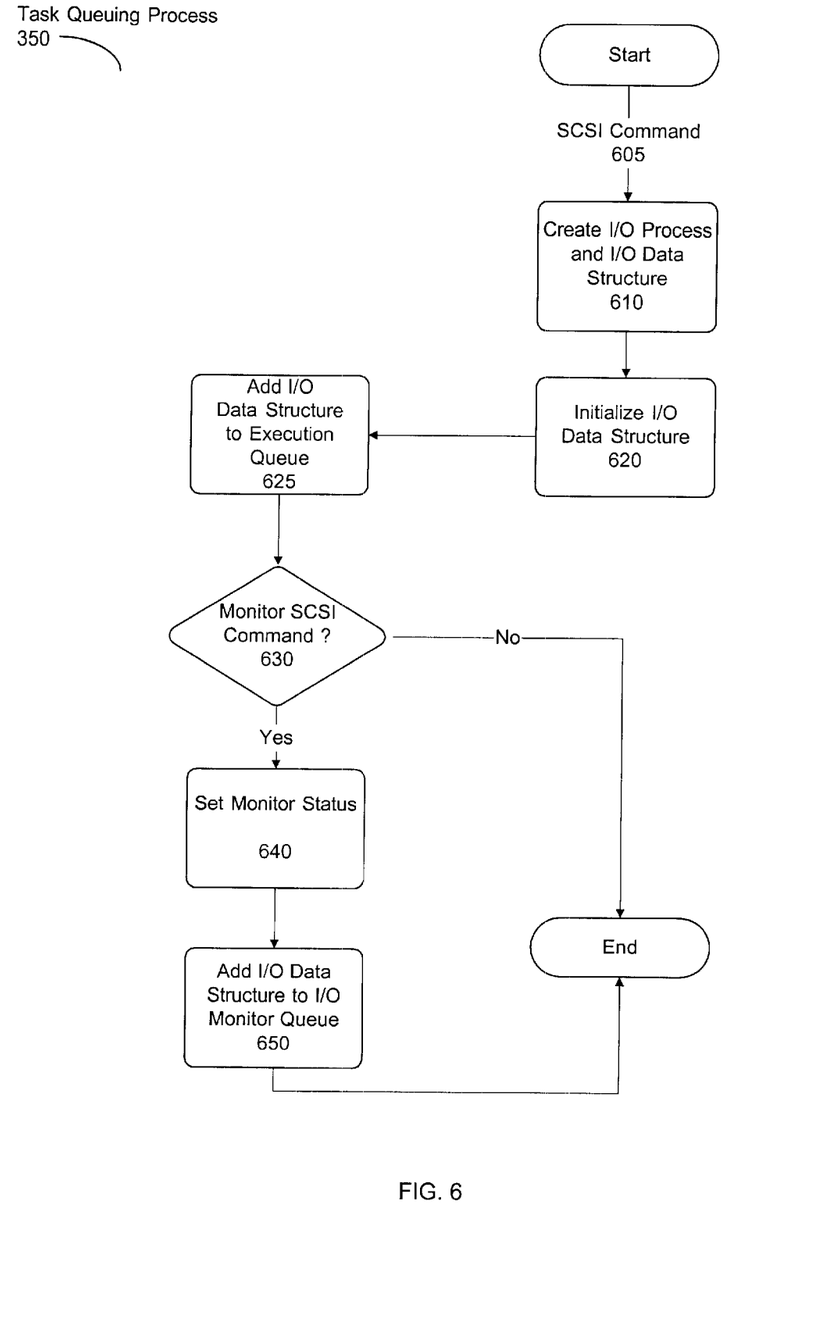
FIG. 6 illustrates one embodiment of an inventive task queuing procedure, for queuing a reference to a command that is being monitored for maximum command response time.

An exemplary embodiment of task queuing process 350 (see FIG. 3) is now described relative to the flowchart illustration in FIG. 6. Task queuing process 350 is initiated by controller 300 in response to receipt of a SCSI command 605 from a host system. At step 610, task queuing procedure 350 creates an I/O process (as discussed above in detail) to track the progress of SCSI command 605. Additionally, at step 610, task queuing process 350 creates I/O process data structure 400, used by task monitor process 355 to implement the guaranteed maximum command response time feature of the present invention (in contrast to creating a conventional I/O process data structure 200). Task monitor process 355 is discussed in great detail below in reference to FIG. 7.

At step 620, task queuing process 350 initializes a number of elements in I/O process data structure 400, such as, for example, time stamp 451 and link pointer 450. In particular, task curing process 350 initializes time stamp 451 such that it reflects the time that this I/O process data structure 400 was created.

At step 625, I/O data structure 400 is added to an execution queue (not shown). An execution queue contains a respective I/O data structure 400 for each I/O process that is executing on controller 300, regardless of whether a particular I/O process is being monitored for maximum command response time. For purposes of the present invention, an execution queue can be implemented in a variety of ways as are known in the art, including, for example, as a static sized array. However, it is desirable that in a preferred embodiment of the invention, the execution queue is implemented as a linked list data structure for the same reasons given above with respect to the benefits of using linked list data structures.

At step 630, task monitor process 350 determines whether command 605 should be monitored for maximum command response time. In a preferred embodiment, each SCSI read data request and each SCSI write data request that controller 300 receives is monitored for maximum command response time. SCSI read/write commands are preferably monitored because read/write commands typically require the greatest amount of time to execute for a number reasons, including, for example, built in latent access time during read and write disk drive accesses, and the amount of time required to transmit sometimes large amounts of data.

It is contemplated that in yet other embodiments of the invention, receipt by controller 300 of other SCSI commands, for example inquiry, read capacity, test unit ready, or vendor unique SCSI commands, will result in corresponding ending SCSI statuses being sent to the host system within a predetermined maximum command response time, instead of, or in addition to, the read/write commands.

At step 640, if it was determined that the SCSI command should be monitored for maximum command response time (step 630), controller 300 sets monitor status 452 (see FIG. 4) to FALSE, indicating that an ending status has not yet been sent by controller 300 to the SCSI command initiating host system.

At step 650, task queuing process 350 adds a pointer that references I/O process data structure 400 to I/O process monitor queue 500 (See FIG. 5). Adding (and deleting) a pointer to a linked list is a common software programming construct and procedure facilitated by common software programming function calls known in the art, and therefore, not discussed in greater detail here.

Task Monitor Process 355

Figure 7:
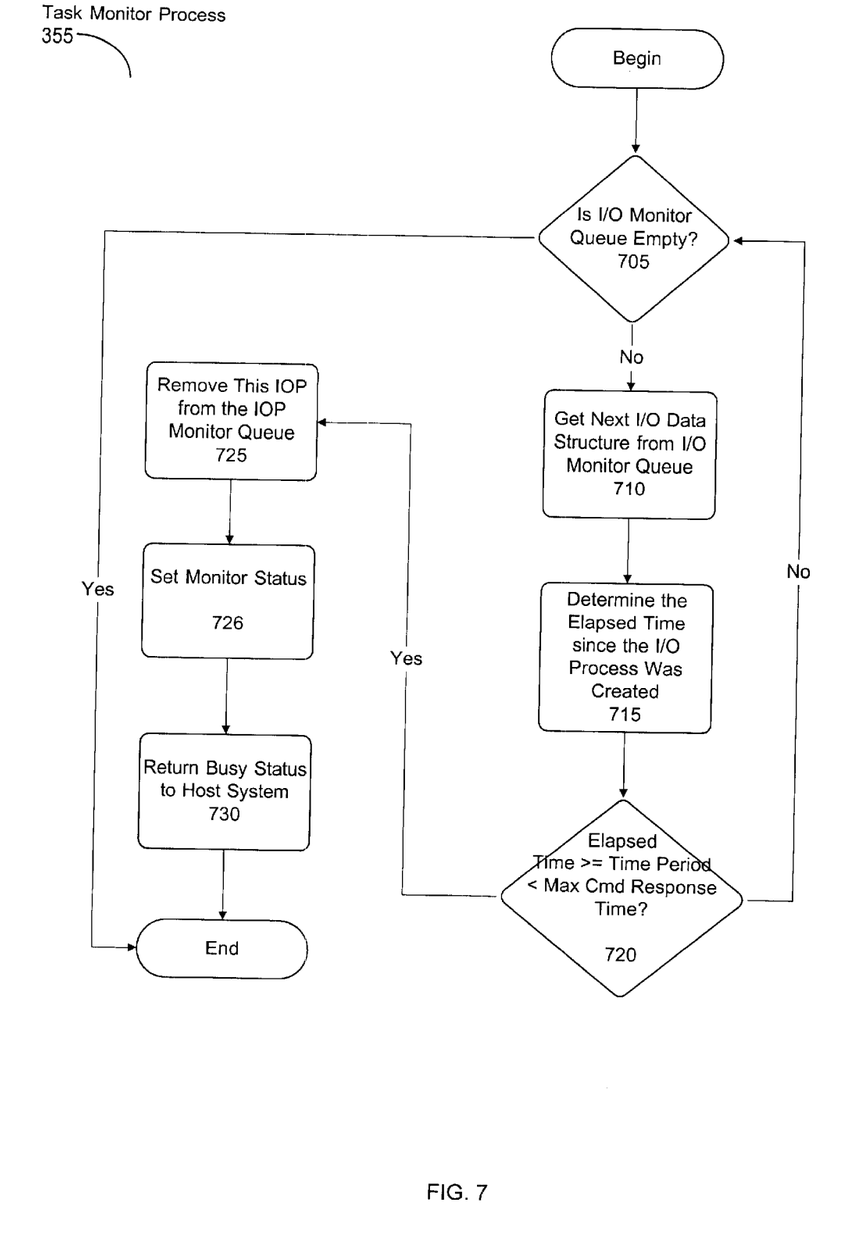
FIG. 7 illustrates an exemplary embodiment of a task monitor process, for monitoring each I/O process that is tracking a completion status of a command being monitored for maximum command response time, according to the invention.

An exemplary embodiment of Task Monitor Process 355 (See FIG. 7) is now described relative to the flowchart illustration in FIG. 7. Task monitor process 355 checks each I/O process that is tracking a monitored SCSI command (see step 630, FIG. 6) for potential maximum command response time violations. More particularly, task monitor process 355 checks each I/O process data structure 400 stored or referenced in I/O process monitor queue 500 to determine whether the SCSI command that is being tracked by an I/O process associated with a respective I/O process data structure 400, has completed within a predetermined second time interval.

The predetermined second time interval is set by controller 300 to a value that is less than the maximum command response time. In a preferred embodiment of the present invention, second predetermined time interval is set to equal a value that is less than or equal to the following: the maximum command response time minus the amount of time that controller 300 requires to send a status back to the host. The amount of time that controller 300 requires to send a status back to the host is dependent upon a number of factors, including, for example, the amount of time that controller 300 requires to determine whether any I/O process (es) in I/O process monitor queue require a status to be sent to the host system.

At step 705, controller 300 determines whether I/O process monitor queue 500 is empty. In a preferred embodiment of the present invention, controller 300 uses two global variables to determine whether or not I/O process monitor queue 500 is empty. A pointer to the very first element, or "head" of I/O process monitor queue 500 is stored by controller 300 in memory 345 as a first global variable (or head global variable). Also, a pointer to the very last element, or "tail" (or tail global variable) of I/O process monitor queue 500 is stored in memory 345 as a second global variable. If these two global variables, head and tail, are zero (null), then I/O process monitor queue 500 is empty. Otherwise, I/O process Monitor Queue is not empty.

At step 710, after determining that I/O process monitor queue 500 is not empty (step 705), an VO process data structure 400 is accessed by task monitor process 355 from I/O process monitor queue 500. As discussed above, I/O process monitor queue 500 was populated with I/O process data structure(s) by task queuing procedure 350 (FIG. 6, step 650). In one embodiment of the present invention, the first, or current I/O process data structure 400 in 1/O process Monitor Queue 500 is accessed by using the head global variable, which as described above in reference to step 705, points to the very first element of I/O process Monitor Queue 500. If there is more than one SCSI command being monitored by task monitor process 355, each subsequent to I/O process data structure 400 is pointed to by the then current I/O process data structure's 400 link pointer 453. If the current I/O process data structures 400 link pointer 453 is null, then there are no more I/O process data structures 400 in I/O process monitor queue 500.

At step 715, task monitor process 355 determines the elapsed time since the I/O process was created by controller 300. This elapsed time represents the time that the SCSI command that is being tracked by the I/O process has been executing in one or more SCSI disk drives. In one embodiment of the present invention, time stamp 451 (See FIG. 4), is subtracted from a current time accessed by task monitor-process 355 from a system clock in a host system. The system clock is conventionally used to ascertain absolute and relative time information. Accessing the current time from a system clock is a common software programming procedure facilitated by common software programming function calls, and therefore, not discussed in greater detail here.

At step 720, task monitor process 355 determines if the elapsed time (step 715) has a predetermined magnitude relationship (such as less than) the maximum command response time. In particular, test monitor process 355 determines if the elapsed time is greater than a predetermined second period of time less than the maximum command response time. If not, task monitor process 355 continues at step 705 where it determines if there is another SCSI command that is being monitored for maximum command response time.

Otherwise, task monitor process 355 continues at step 725, where task monitor process 355 removes the timed-out SCSI command's respective I/O process data structure 400 from I/O process monitor queue 500. Removing an element (in this example, an I/O process data structure 400) from a linked list (in this example, I/O process monitor queue 500) is a common software programming procedure facilitated by common software programming function calls, and therefore, will not be discussed in greater detail here.

At step 726, test monitor process 355 sets monitor status 452 to FALSE, indicating that an ending status has already been sent to the SCSI command initiating host system. At step 730, task monitor process 355 sends an ending status of "busy," hereinafter often referred to as a busy status, to the command initiating host system. In this manner, the host system is guaranteed to receive an ending SCSI status with respect to a SCSI command within the predetermined maximum command response time.

In the preferred embodiment, task monitor process 355 is iterative in that it reoccurs at a predetermined third time interval set by controller 300, that is less than or equal to the predetermined second time interval (thus, it is also less than the maximum command response time). Each of these first, second, and third intervals may alternatively be a periodic and occur according to a predetermined set of rules. The value of the predetermined third time interval determines the number of milliseconds (or some other unit of time) that elapse between iterations of task monitor process 355.

It is desirable that the predetermined third time interval is set by controller 300 according to two variables, the required maximum command response time, and the amount of time that controller 300 takes to send a status back to the host. To ensure that a status is sent to the command initiating host system within the required maximum command response time, the predetermined third time interval should be less than or equal to the time required to send a status back to the host system.if In a preferred embodiment of the present invention, where the maximum command response time is equal to 3000 milliseconds, the predetermined third time interval to set by controller 300 to equal 100 milliseconds, but values between about 20 milliseconds and 1000 milliseconds may be used. Typically shorter times (e.g. between about 20 milliseconds and about 500 milliseconds) are used for finer granularity while longer times (e.g. between about 500 milliseconds and about 1000 milliseconds or greater) are used for less monitoring overhead.

In yet another embodiment, values between less than a millisecond or a few milliseconds to the maximum command response time can be used. In such an embodiment, task monitor process 355 runs continuously, and in there may not be enough time to return the ending status before the maximum command response time expires.

The value of the predetermined second period of time determines the default number of milliseconds that can elapse before a SCSI command is timed out. The predetermined second period of time is typically selected to be a value between the maximum command response time—1000 milliseconds and the maximum command response time—500 milliseconds. Such a selection of the predetermined second period of time allows 500 to 1000 milliseconds for a device controller to return an ending SCSI status of "busy" to a host system and still meet the requirement of guaranteeing an ending status within the maximum command response time.

Improved Execution Speed for Re-Tried Commands through Better Cache Memory Management Another advantageous aspect of the present invention is that it improves the chance that a re-tried SCSI command from a host system may complete faster than expected. To understand this advantageous aspect, it is first beneficial to discuss data cache behavior. At its most basic level, a data cache contains a collection of recent data references. For example, when a host system requests data from a controller by issuing a SCSI read command, if the requested data is not in on-board cache (known as a cache miss), the controller retrieves the data from one or more SCSI disk drives into on-board cache before transferring the data to those system. However, if the requested data is an on-board cache (known as a cache hit), the controller sends the data immediately to the host system.

Analogously, when a host system issues a SCSI write command, if the data to be written is not in on-board cache (cache miss), data is transferred from the host into on-board cache prior to transferring, by the controller, this data to one or more SCSI disk drives. However, if the data to be written is in on-board cache (cache hit), the controller immediately distributes the data to one or more SCSI disk drives.

During a heavy I/O load between a host system and a controller, because data transfers cannot proceed until the data is in on-board cache, data transfers that result in cache misses commonly must wait until on-board cache becomes available from I/O processes that have completed. Therefore, it is advantageous for the data to already be in cache.

The present invention does not terminate either an I/O process that has timed out for its corresponding SCSI command that is executing on one or more physical SCSI devices, but instead allows both to continue execution and complete respectively. And, upon completion of the timed out SCSI command, controller 300, contrary to conventional controllers, does not automatically return the SCSI command results (if any) and the SCSI command's corresponding ending SCSI status to the host system, but instead controller 300 stores the results and the corresponding ending SCSI status into cache memory 365, or other memory that may optionally be available for such purpose.

As a result, it is highly probable that the timed out SCSI command's data (if any) and its corresponding ending SCSI status will already be stored by controller 300 in cache memory 365 if and when a host system retries a timed out SCSI command.

In light of the above, it is clear that the present invention ensures that SCSI commands that have timed out, and are then subsequently resubmitted by a host system, may complete faster than would be expected (given the time at which the second, or subsequent, instance of the SCSI command was sent to controller 300) since embodiments of the inventive procedure check cache memory 365 to determine if a result from an earlier instance of the command is present in the cache, and return this result rather than waiting for execution of the subsequent instance of the SCSI command.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

Further, the method and system described herein above is amenable for execution on various types of executable mediums other than a memory device such as a random access memory. Other types of executable mediums can be used, such as but not limited to, a computer readable storage medium which can be any memory device, compact disc, or floppy disk, and possibly additional error correction information across at least a subset of disk drives 70, 80, 90, and 100, in disk array 60, in response to receiving a SCSI write data command.

What is claimed:

1. In a data storage system that includes a host computer operatively coupled by a controller to a storage device, a method to provide the host computer with a status corresponding to success of a first command, the method comprising the following steps:

(a) receiving the first command;

(b) defining a first time interval ($\Delta T1$) that does not exceed a predetermined maximum command response time in which said status must be sent to said host computer;

(c) distributing to the storage device at least one second command responsive to said first command;

(d) monitoring said second command distributed at step (c) to determine a first time status that will be a first success status if said second command completes execution within said $\Delta T1$, and that will be a first failure status if said second command fails to complete execution within said $\Delta T1$; and (e) sending to said host computer the status selected from a group consisting of: (i) data associated with said first command if step (d) determines a first success status; and (ii) a first status if step (d) determines that said first time status is said first failure status.

2. The method of claim 1 wherein the $\Delta T1$ is predetermined.

3. The method of claim 1, wherein start of said $\Delta T1$ is determined at step (a).

4. The method of claim 1, wherein said first command includes a time value indicating when the host computer initiated said first command, and said time value indicates start of said $\Delta T1$.

5. The method of claim 1, wherein at step (a) said first command is initiated by said host computer.

6. The method of claim 1, wherein said $\Delta T1$ commences after said first command is initiated at step (a).

7. The method of claim 1, wherein at step (d) said second command is selected from a group consisting of: a SCSI write data command; and a SCSI read data command.

8. The method of claim 1, wherein said first status at step (e) includes a busy status.

9. The method of claim 1, after sending at step (e), the method further including:
saving a set of results of said second command distributed at step (c) into a data cache coupled with the controller;
receiving a third command that represents a subsequent instance of the first command; and
sending to said host computer the set of results in response to receiving the third command.

10. The method of claim 1, wherein the storage device is a Redundant Array of Independent Disks (RAID) and the controller is a RAID controller.

11. The method of claim 1, wherein at step (e)(i) further comprises sending a good status to the host computer.

12. The method of claim 1, wherein at least one of the steps is carried out by the controller.

13. The method of claim 1, wherein the host computer initiates the first command at step (a).

14. The method of claim 1, wherein the status is select from a group consisting of: the first status; a second status; and a successful first command.

15. The method of claim 1, wherein:
step (b) includes associating with said first command a time stamp showing when said first command was received by said controller, and further includes initiating at a time of said time stamp a second time interval ($\Delta T2$) that is less than said $\Delta T1$;
step (d) further includes monitoring said second command distributed at step (c) to determine a second time status that will be a second success status if said second command completes executions within said $\Delta T2$, and will be a second failure status if said second command fails to complete within said $\Delta T2$; and
said group at step (e) further consisting of: (iii) the first status if step (d) determines that said second time status is said second failure status.

16. The method of claim 15, wherein in said first status includes a busy status.

17. The method of claim 15, wherein said second command at step (d) is selected from a group consisting of: a SCSI write data command; and a SCSI read data command.

18. The method of claim 15, wherein said $\Delta T2$ is reduced by a proportional amount time that the controller requires to send the status back to the host computer.

19. The method of claim 15, wherein said group at step (e) further consisting of: (iv) posting a second status to said host computer if step (d) determines a second time status is said second success status.

20. The method of claim 19, wherein said second status includes a good status.

21. The method of claim 15, further including defining a third time interval ($\Delta T3$) that does not exceed said $\Delta T2$; and wherein said step (d) is an iterative process that reoccurs at every $\Delta T3$.

22. The method of claim 21, wherein said step (d) is an iterative process that reoccurs at every third $\Delta T3$.

23. The method of claim 21, wherein:
said $\Delta T1$ is a time interval ranging from about 3 seconds to about 10 seconds;
said $\Delta T2$ is a time interval ranging from about 200 milliseconds to about 2 seconds; and
said $\Delta T3$ is a time interval ranging from about 20 milliseconds to about 1 second.

24. The method of claim 23, wherein at least one of said time intervals is predetermined.

25. In a data storage system that includes a host computer operatively coupled by a controller to a storage device, a method to provide the host computer with a status corresponding to success of a first command, the method comprising the following steps:
(a) receiving the first command initiated by the host computer;
(b) determining a predefined first time interval ($\Delta T1$) that does not exceed a predetermined maximum command response time in which said status must be sent to said host computer, wherein start of said $\Delta T1$ is determined at step (a);
(c) distributing to the storage device at least one second command responsive to said first command;
(d) monitoring said second command distributed at step (c) to determine a first time status that will be a first success status if said second command completes execution within said $\Delta T1$, and that will be a first failure status if said second command fails to complete execution within said $\Delta T1$; and
(e) sending to said host computer the status selected from a group consisting of:
(i) data associated with said first command if step (d) determines a first success status; and
(ii) a first status if step (d) determines that said first time status is said first failure status, wherein said first status includes a busy status and if (ii) is a selected status processing said busy status by:
(1) saving a set of results of said second command distributed at step (c) into a data cache coupled with the controller;
(2) receiving a third command that represents a subsequent instance of the first command; and
(3) sending to said host computer the set of results in response to receiving the third command.

26. The method of claim 25, wherein:
step (b) further includes:
associating with said first command a time stamp showing when said first command was received by said controller;
initiating at a time of said time stamp a second time interval ($\Delta T2$) that is less than said $\Delta T1$, said $\Delta T2$ is reduced by a proportional amount time that the controller requires to send the status back to the host computer;
defining a third time interval ($\Delta T3$) that does not exceed said $\Delta T2$, wherein said $\Delta T1$ is a time interval ranging from about 3 seconds to about 10seconds, said $\Delta T2$ is a time interval ranging from about 200 milliseconds to about 2 seconds, and said ΔT3 is a time interval ranging from about 20 milliseconds to about 1 second, and at least one of said time intervals is predetermined;

wherein step (d) is an iterative process that reoccurs at every third ΔT3 and further includes monitoring said second command to determine a second time status that will be a second success status if said second command completes executions within said ΔT2, and will be a second failure status if said second command fails to complete within said ΔT2; and said group at step (e) further consisting of:
(iii) the first status if step (d) determines that said second time status is aid second failure status; and
(iv) posting a second status to said host computer if step (d) determines a second time status is said second success status.

27. A computer program product for use with a host computer operatively coupled by a controller to a storage device, the computer program product comprising a storage device and a computer program mechanism embedded therein, the computer program mechanism comprising:

a program module to provide the host computer with a status corresponding to success of a first command, the program module including instructions for:
(a) receiving the first command;
(b) defining a first time interval (ΔT1) that does not exceed a predetermined maximum command response time in which said status must be sent to said host computer;
(c) distributing to the storage device at least one second command responsive to said first command;
(d) monitoring said second command distributed at step (c) to determine a first time status that will be a first success status if said second command completes execution within said ΔT1, and that will be a first failure status if said second command fails to complete execution within said ΔT1; and
(e) sending to said host computer the status selected from a group consisting of: (i) data associated with said first command if step (d) determines a first success status; and (ii) a first status if step (d) determines that said first time status is said first failure status.

28. The computer program product of claim 27 wherein the ΔT1 is predetermined.

29. The computer program product of claim 27, wherein:
step (b) includes associating with said first command a time stamp showing when said first command was received by said controller, and further includes initiating at a time of said time stamp a second time interval (ΔT2) that is less than said ΔT1;
step (d) further includes monitoring said second command distributed at step (c) to determine a second time status that will be a second success status if said second command completes executions within said ΔT2, and will be a second failure status if said second command fails to complete within said ΔT2; and
said group at step (e) further consisting of: (iii) the first status if step (d) determines that said second time status is said second failure status.

30. The computer program product of claim 27, wherein said first status includes a busy status and said second status includes a good status.

31. The computer program product of claim 29, wherein said group at step (e) further consisting of: (iv) posting a second status to said host computer if step (d) determines a second time status that is a second success status.

32. The computer program product of claim 27, wherein said second command at step (d) is selected from a group consisting of: a SCSI write data command; and a SCSI read data command.

33. The computer program product of claim 27, further including:
saving, after sending at step (e), a set of results of said second command distributed at step (c) into a data cache coupled with the controller;
receiving a third command that represents a subsequent instance of the first command; and
sending to said host computer the set of results in response to receiving the third command.

34. The computer program product of claim 27, further including at least one instruction defining a third time interval (ΔT3) that does not exceed said ΔT2; and wherein said step (d) is an iterative process that reoccurs at every ΔT3.

35. The computer program product of claim 34, wherein said step (d) is an iterative process that reoccurs at every third ΔT3.

36. The computer program product of claim 34, wherein:
said ΔT1 is a time interval ranging from about 3 seconds to about 10 seconds;
said ΔT2 is a time interval ranging from about 200 milliseconds to about 2 seconds; and
said ΔT3 is a time interval ranging from about 20 milliseconds to about 1 second.

37. The computer program product of claim 36, wherein at least one of said time intervals is predetermined.

38. The computer program product of claim 22, wherein said ΔT2 is reduced by a proportional amount time that the controller requires to send the status back to the host computer.

39. An apparatus to provide a host computer operatively coupled by a controller to a storage device with a status corresponding to success of a first command, the apparatus comprising:

means for receiving the first command;
means for defining a first time interval (ΔT1) that does not exceed a predetermined maximum command response time in which said status must be sent to said host computer, start of said ΔT1 is determined by means for receiving;
means for associating with said first command a time stamp showing when said first command was received by said controller, and further includes initiating at a time of said time stamp a second time interval (ΔT2) that is less than said ΔT1;
means for distributing to the storage device at least one second command responsive to said first command;
means for monitoring said second command distributed according to means for distributing to determine a first time status that will be a first success status if said second command completes execution within said ΔT1, and that will be a first failure status if said second command fails to complete execution within said ΔT1, and to determine a second time status that will be a second success status if said second command completes executions within said ΔT2, and will be a second failure status if said second command fails to complete within said ΔT2; and
means for sending to said host computer the status selected from a group consisting of: (i) data associated with said first command if means for monitoring determines a first success status; (ii) a first status means for monitoring determines that said first time status is said first failure status; and (iii) the first status if means for monitoring determines that said second time status is said second failure status.

40. The apparatus of claim 39, wherein the first time status includes a busy status, and the second time status includes a good status.

41. The apparatus of claim 39, wherein said second command monitored by said means for monitoring is selected from a group consisting of: a SCSI write data command; and a SCSI read data command.

42. The apparatus of claim 39, further including:
means for saving a set of results responsive to said second command distributed by said means for distributing into a data cache coupled with the controller;
means for receiving a third command that represents a subsequent instance of the first command; and
means for sending to said host computer the set of results responsive to receipt of the third command.

43. The apparatus claim 39, wherein:
said means for determining defines a third time interval ($\Delta T3$) that does not exceed said $\Delta T2$; and said means for monitoring is an iterative process that reoccurs at every $\Delta T3$.

44. The apparatus claim 43, wherein said means for monitoring is an iterative process that reoccurs at every third $\Delta T3$.

45. The apparatus of claim 43, wherein:
said $\Delta T1$ is a time interval ranging from about 3 seconds to about 10 seconds;
said $\Delta T2$ is a time interval ranging from about 200 milliseconds to about 2 seconds; and
said $\Delta T3$ is a time interval ranging from about 20 milliseconds to about 1 second.

46. The apparatus of claim 45, wherein at least one of said time intervals is predetermined.

47. The apparatus of claim 39, wherein the storage device is a Redundant Array of Independent Disks (RAID) and the controller is a RAID controller.

48. The apparatus of claim 39, wherein said $\Delta T2$ is reduced by a proportional amount time that the controller requires to send the status back to the host computer.

49. An apparatus to provide a host computer operatively coupled by a controller to a storage device with a status corresponding to success of a first command, the apparatus comprising:
an associative circuit having a first procedure to receive the first command, a second procedure to define a first time interval ($\Delta T1$) that does not exceed a predetermined maximum command response time in which said status must be sent to said host computer, start of said $\Delta T1$ is determined by the first procedure, and a third procedure to associate with said first command a time stamp showing when said first command was received by said controller, and further includes initiating at a time of said time stamp a second time interval ($\Delta T2$) that is less than said $\Delta T1$;
a distribution circuit having a distribution procedure to distribute to the storage device at least one second command responsive to said first command;
a monitoring circuit having a monitoring procedure to monitor said second command distributed according to said distributing procedure to determine a first time status that will be a first success status if said second command completes execution within said $\Delta T1$, and that will be a first failure status if said second command fails to complete execution within said $\Delta T1$, and to determine a second time status that will be a second success status if said second command completes executions within said $\Delta T2$, and will be a second failure status if said second command fails to complete within said $\Delta T2$; and
a sending circuit having a sending procedure to send to said host computer the status selected from a group consisting of: (i) data associated with said first command if said monitoring procedure determines a first success status; (ii) a first status if said monitoring procedure determines that said first time status is said first failure status; and (iii) the first status if said monitoring procedure determines that said second time status is said second failure status.

50. The apparatus of claim 49, wherein the said sending procedure sends a second status to the host computer if said second command does complete execution within the $\Delta T2$.

51. The apparatus of claim 50, wherein the first time status includes a busy status, and the second time status includes a good status.

52. The apparatus of claim 49, wherein said second command is selected from a group consisting of: a SCSI write data command; and a SCSI read data command.

53. The apparatus of claim 49, further including:
a saving circuit having a saving procedure to save a set of results of said second command distributed at said distribution procedure into a data cache coupled with the controller;
wherein said first procedure capable of receiving a third command that represents a subsequent instance of the first command; and
wherein said sending procedure capable of sending to said host computer the set of results in response to receiving the third command.

54. The apparatus of claim 49, wherein said determining procedure further including defining a third time interval ($\Delta T3$) that does not exceed said $\Delta T2$; and said monitoring procedure is an iterative process that reoccurs at every $\Delta T3$.

55. The apparatus of claim 49, wherein said monitoring procedure is iterative such that the monitoring procedure reoccurs at every third $\Delta T3$.

56. The apparatus of claim 54, wherein:
said $\Delta T1$ is a time interval ranging from about 3 seconds to about 10 seconds;
said $\Delta T2$ is a time interval ranging from about 200 milliseconds to about 2 seconds; and
said $\Delta T3$ is a time interval ranging from about 20 milliseconds to about 1 second.

57. The apparatus of claim 56, wherein at least one of said time intervals is predetermined.

58. The apparatus of claim 49, wherein the storage device is a Redundant Array of Independent Disks (RAID) and the controller is a RAID controller.

59. The apparatus of claim 49, wherein said $\Delta T2$ is reduced by a proportional amount time that the controller requires to send the status back to the host computer.

* * * * *